United States Patent [19]

Guth et al.

[11] Patent Number: 5,096,684

[45] Date of Patent: Mar. 17, 1992

[54] PROCESS FOR THE SYNTHESIS OF PRECURSORS OF MOLECULAR SIEVES OF THE SILICOALUMINOPHOSPHATE TYPE, PRECURSORS OBTAINED AND THEIR APPLICATION TO OBTAINING THE SAID MOLECULAR SIEVES

[75] Inventors: Francoise Guth, Mulhouse; Henri Kessler, Weittenheim; Thierry Des Courieres, Lyons, all of France

[73] Assignee: Elf France, Courbevoie, France

[21] Appl. No.: 502,423

[22] Filed: Mar. 30, 1990

[30] Foreign Application Priority Data

Mar. 31, 1989 [FR] France .................................. 89 04233

[51] Int. Cl.$^5$ .............................................. C01B 25/36
[52] U.S. Cl. ...................................... 423/306; 423/328
[58] Field of Search ............... 423/305, 306, 328, 329, 423/330; 502/208, 214, 232

[56] References Cited

U.S. PATENT DOCUMENTS

| | | | |
|---|---|---|---|
| 4,440,871 | 4/1984 | Lok et al. | 502/214 |
| 4,673,559 | 6/1987 | Derouane et al. | 423/328 |
| 4,786,487 | 11/1988 | Kuehl | 423/306 |

*Primary Examiner*—R. Bruce Breneman
*Attorney, Agent, or Firm*—Burgess, Ryan and Wayne

[57] ABSTRACT

Process for the synthesis of precursors of molecular sieves of the silicoaluminophosphate type by heating to $\geq 100°$ C. under autogenous pressure a reaction mixture containing sources of silicon, aluminum and phosphorus in the presence of an organic structuring agent and of hydrofluoric acid. The precursor obtained can be converted into molecular sieve by calcination. Molecular sieves of the silicoaluminophosphate type can be used as adsorbants and catalysts for the conversion of hydrocarbons.

25 Claims, No Drawings

PROCESS FOR THE SYNTHESIS OF PRECURSORS OF MOLECULAR SIEVES OF THE SILICOALUMINOPHOSPHATE TYPE, PRECURSORS OBTAINED AND THEIR APPLICATION TO OBTAINING THE SAID MOLECULAR SIEVES

FIELD OF THE INVENTION

The present invention relates to a new process for synthesis of precursors of molecular sieves of the silicoaluminophosphate type, to precursors obtained by this process and their application to obtaining the said molecular sieves.

BACKGROUND OF THE INVENTION

A number of microporous crystalline aluminium phosphates exhibiting molecular sieve properties have been described in European Patent 43,562. These products correspond to the general formula:

$$m\ R{:}Al_2O_3{:}(1\pm0.2)P_2O_5{:}n\ H_2O$$

where R denotes an organic structuring agent, amine or quaternary ammonium salt, occluded in the channels of the structure, m and n denote the number of moles of R and of $H_2O$ respectively per mole of $Al_2O_3$. The Al/P molar ratio of these materials is practically equal to 1. The positive charge $PO_2^+$ associated with the phosphorus of the tetrahedra is balanced by $AlO_2^-$ associated with the presence of aluminium in the tetrahedra. As a result of this, these products do not exhibit ion exchange properties.

On the other hand, once calcined to remove the organic species, these materials exhibit a relatively marked hydrophilic character and adsorb various other molecules. On the other hand, the catalytic properties remain very limited, at least insofar as acid-base catalysis is concerned.

The incorporation of silicon into these microporous aluminium phosphates is described in Patents EP-B-103,117, EP-A-146,384 to 146,389, EP-A-147,991, EP-A-154,122, EP-A-185,525 and GB-B-2,155,916.

The silicoaluminophosphates thus obtained are molecular sieves and have ion exchange properties. They can be converted, generally by simple calcination, into solids exhibiting catalytic properties.

The synthesis of silicoaluminophosphates is performed by a hydrothermal route, by heating to 100°–200° C. for 5 hours to 20 days, optionally with agitation, a reaction mixture comprising an organic structuring agent R and sources of aluminium, of silicon and of phosphorus. The initial pH of the medium is 3–8, the final pH is 8–10. The solid obtained corresponds to the formula:

$$R_{m'}{:}Si_x\ Al_y\ P_z\ O_2{:}n'H_2O$$

where R is the organic structuring agent, m' corresponds to the number of moles of structuring agent, n' to the number of moles of water per mole of $Si_x\ Al_y\ P_z\ O_2$, and x, y and z correspond to the molar fractions of silicon, aluminium and phosphorus.

The maximum value of m' depends on the nature of R, more precisely on its size and its charge, as well as on the pore volume of the microporous solid. The value of m' is generally between 0 and 0.3 and n' varies between 0 and 0.3.

The molar fractions x, y and z are such that $x+y+z=1$. The value of x generally lies between >0 and 0.3, y between 0.2 and 0.6 and z between 0.2 and 0.6.

Compensating cations, generally alkali metal or alkaline-earth metal cations may be present in the structure. These cations originate from the synthesis medium or from an ion exchange after calcination. They take part with the organic cations $R^+$ or with the protons in compensating the negative charge of the structure resulting from the incorporation of silicon in the tetrahedra.

The silicoaluminophosphates obtained by this process exhibit crystallization defects which are sometimes at the source of their lack of heat stability.

We have now found a process of synthesis which makes it possible to improve the crystallinity and the purity of silicoaluminophosphates, and this appreciably improves the heat stability of the products obtained.

SUMMARY OF THE INVENTION

At the same time, this process shortens the crystallization times, which is a source of saving.

The new process for the synthesis of precursors of molecular seives of the silicoaluminophosphate type comprises in producing a reaction mixture containing water, a source of aluminium, a source of silicon, a source of phosphorus, an organic structuring agent and optionally a source of compensating cations, and acidic or basic compounds allowing the pH of the medium to be brought to the desired value, generally between 5 and 9, in heating this mixture to a temperature $\geq 100°$ C. under autogenous pressure for a sufficient time to effect the crystallization, and in then separating the crystallized solid, and is characterized in that the reaction mixture contains hydrofluoric acid as a source of fluoride anions.

The molar composition of the reaction mixture, referred to $Al_2O_3$, is the following (R corresponds to the structuring agent):

$$r\ R{:}s\ SiO_2{:}Al_2O_3{:}\ p\ P_2O_5{:}\ f\ F{:}h\ H_2O$$

The value of r generally varies between 0.01 and 3, preferably between 1 and 2, s varies between 0.01 and 3, preferably between 0.5 and 1, p varies between 0.01 and 1, preferably between 0.5 and 1, f varies between 0.01 and 2, preferably between 0.5 and 1 and h varies between 0 and 500, preferably 50 and 100.

The organic structuring agent generally contains an element of group 5a of the Periodic Table, such as nitrogen or phosphorus. The agent involved is preferably selected from nitrogen derivatives and more particular amines or quaternary ammonium salts. We can mention diethylamine, triethylamine, dipropylamine, tripropylamine, dibutylamine, tributylamine, tetraethylammonium hydroxide, tetrapropylammonium hydroxide and tetrabutylammonium hydroxide. It is also possible to employ aminoalcohols or aminoethers, such as diethylaminoethanol or morpholine.

Among the sources of aluminium there may be mentioned aluminium oxides and hydroxides, such as aluminium hydroxide $Al(OH)_3$, boehmite $AlO(OH)$ or pseudoboehmite, an alumina, preferably a reactive alumina such as gamma alumina, aluminium salts such as aluminium fluoride, aluminium sulphate, aluminium phosphate or sodium aluminate, and aluminium alkoxides of the formula $Al(OR_1)_3$ in which $R_1$ is a $C_1$–$C_4$ alkyl radical.

Pseudoboehmite or aluminium isopropoxide is preferably employed.

Many sources of silicon can be employed; there may be mentioned silicas in the form of hydrogel, aerogel or colloidal suspension, silicas originating from the precipitation of soluble silicates or from the hydrolysis of silicic esters, such as the tetraethyl ester of monoorthosilicic acid, $Si(OEt)_4$ or from the hydrolysis of complexes such as sodium fluorosilicate $Na_2SiF_6$ or of ammonium fluorosilicate $(NH_4)_2SiF_6$.

The preferred source of silicon is the colloidal suspension or the aerogel.

Instead of starting with separate sources of aluminium and of silicon it is also possible to employ sources where they are combined, such as crystalline aluminosilicates or preferably amorphous silica-alumina gels.

The preferred source of phosphorus is phosphoric acid, but its salts and esters such as alkali metal phosphates, reactive aluminium phosphates or alkyl phosphates are also suitable.

The acids or acid salts and, the bases or base salts which are optionally added to adjust the pH of the medium to the desired value can be chosen from common acids such as, for example, hydrochloric acid, citric acid, sulphuric acid, acetic acid, acidic salts such as ammonium hydrogen fluoride, potassium hydrogen fluoride, sodium hydrogen sulphate and common bases such as aqueous ammonia, sodium hydroxide, acidic or neutral sodium carbonates and nitrogenous bases such as methylamine. Buffer mixtures made up, for example, of acetic acid and sodium acetate or aqueous ammonia and ammonium chloride, are also suitable.

Inorganic, preferably alkali metal, cations compensating the negative charge of the structure are generally not supplied in the form of compounds which are added separately. They frequently originate from compounds added to the reaction mixture, such as the sources of Si, Al and/or P, or the structuring agent or an agent for adjusting the pH.

However, it is possible to add alkali metal or alkaine-earth metal cations, preferably alkali metal cations in the form of chlorides, sulphates, carbonates or acetates.

The first stage of the process consists in producing the reaction mixture containing water and the sources of aluminium, phosphorus, silicon, fluoride anions and organic structuring agent, and optionally the source of compensating cations and the compound(s) with an acidic or basic effect. This mixture can be produced in any order.

The preferred operating procedure consists in forming an aluminophosphate gel and in adding the source of silica to it. After homogenizing the whole by stirring, the source of fluoride anions, the organic structuring agent and optionally the source of compensating cations and acidic or basic compounds are added. The whole is once again homogenized carefully. A gel is obtained.

The second stage consists of the crystallization of the gel formed. The crystallization is performed by heating this gel to a temperature of at least 100° C. and preferably of between 100° and 200° C. under autogenous pressure. An autoclave coated with a polymeric material, generally polytetrafluoroethylene, is preferably employed. It is advantageous to stir the gel continuously during the crystallization.

The heating time needed for the crystallization depends on the gel composition and on the crystallization temperature. It lies generally between 5 hours and 15 days.

The morphology, the size and the crystal formation kinetics can be modified by introducing into the reaction medium seed consisting of crystals, optionally ground, of the required molecular sieve. These characteristics can also be modified by changing the rate of stirring of the reaction mass.

After crystallization, the crude synthetic silicoaluminophosphate is recovered by filtration or centrifuging and is dried in air at about 60° C. This solid contains, occluded in its pores and cavities, the organic structuring agent. The latter is associated, on the one hand, with the fluoride and, on the other hand, acts as a compensating cation. Besides the structuring agent, it may also occlude water of hydration and inorganic compensating cations. Dehydration by heating to about 150° C. does not generally cause the departure of the structuring agent.

The precursors of silicoaluminophosphates in their anhydrous form correspond to the general formula:

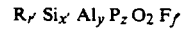

$$R_{r'} Si_{x'} Al_y P_z O_2 F_{f'}$$

where x, y and z denote the molar fractions of silicon, aluminium and phosphorus which are present in the form of oxides. The sum of x, y and z is equal to 1 and the value of x generally lies between 0.01 and 0.3, y between 0.35 and 0.50 and z between 0.2 and 0.49.

The value of r' is between 0.01 and 0.2. The value of f' is between 0.01 and 0.2, which corresponds to a fluorine weight content of the precursor of between 0.3 and 8%.

The silicoaluminophosphates are obtained from these precursors by removal of the structuring agent. The removal takes place by calcining at a temperature above 200° C. and preferably between 400° and 700° C.

After calcination in dry air, the fluorine content drops but generally remains between 0.01 and 0.1% by weight.

The thermal and hydrothermal stability of the silicoaluminophosphates obtained in the presence of fluoride anions originating from hydrofluoric acid is generally higher than that of the silicoaluminophosphates which have the same crystalline structure and are prepared in the absence of fluoride ions or in the presence of fluoride ions originating from salts of hydrofluoric acid.

The thermal and hydrothermal stability of the silicoaluminophosphates according to the invention makes them easier to use as adsorbants and catalysts for the conversion of hydrocarbons.

The identification of the silicoaluminophosphates obtained according to the invention is conveniently performed using their X-ray diffraction pattern.

This diffraction pattern is obtained with the aid of a diffractometer using the conventional powder method with copper $K_\alpha$ radiation. The lattice constant distances dhkl characteristic of the sample are calculated, using the Bragg relationship, from the position of the diffraction peaks, represented by the angle $2\theta$. The estimate of the measurement error $\Delta(dhkl)$ over dhkl is calculated, as a function of the absolute error $\Delta(2\theta)$ associated with the measurement of $2\theta$, by the Bragg relationship. An absolute error $\Delta(2\theta)$ equal to $\pm 0.2°$ is commonly accepted. The relative intensity $I/Io$ associated with each value of dhkl is measured according to the height of the corresponding diffraction peak. The diffraction diagrams shown in Tables I, II, III, IV and V are representative of the various structural types synthesized. The dhkl values and the relative intensities are characteristic of an example of a crude synthetic precursor for each structural type. They do not limit the variations which are observed, linked essentially with the molar fraction of silicon and with the nature of the molecules present in the crude solid as synthesized.

The nomenclature employed in the experimental part to denote the crystalline structure of the various silicoaluminophosphates synthesized is that of European Patent EP 103,117.

The following examples are given to illustrate the invention, no limitation being implied.

EXAMPLE 1: PREPARATION SAPO-5

A reaction mixture made up of 60 g of water and 11.6 g of 85 % orthophosphoric acid (Prolabo) is prepared, to which 20.4 g of aluminium isopropoxide (Merck) are added. The mixture is stirred until homogenized. To this mixture are added, with stirring, 4.5 g of 40% colloidal silica (Ludox AS 40) and then 2 g of 48% hydrofluoric acid (Prolabo) and 7.3 g of tripropylamine (Fluka). The resulting reaction mixture is stirred for several hours.

The molar composition of the final mixture is the following:

$1Pr_3N:0.6SiO_2:1Al_2O_3: 1P_2O_5:76H_2O:1HF$ (The quantities used in the case of each constituent have been calculated for 1/20 of a mole of $Al_2O_3$.)

The mixture (pH=7.5) is heated to 170° C. for 20 hours in a stirred autoclave, lined with polytetrafluoroethylene, 120 cm$^3$ in capacity. The solid is obtained generally after filtration and washing with twice-distilled water, followed by drying in air at 60° C.

Inspection of the solid obtained, using an optical microscope and by SEM (scanning electron microscope) shows crystals in the form of isolated or sometimes combined hexagonal prisms, 30×5 μm in size. No impurity is detected.

X-ray diffration analysis of the crude precursor as synthesized shows that it is a SAPO-5 phase characterized by the diffraction pattern of Table I.

TABLE I

| X-ray diffraction pattern of the crude synthetic sample of SAPO-5 phase prepared according to Example 1. | |
|---|---|
| d hkl 10$^{-10}$ m | I/Io |
| 12.1 | 100 |
| 6.88 | 8 |
| 5.94 | 20 |
| 4.50 | 33 |
| 4.24 | 18 |
| 3.98 | 38 |
| 3.61 | 2 |
| 3.437 | 24 |
| 3.076 | 7 |
| 2.976 | 16 |
| 2.672 | 2 |
| 2.597 | 13 |
| 2.434 | 2 |
| 2.393 | 5 |
| 2.174 | 2 |
| 2.139 | 3 |
| 2.116 | 2 |
| 2.074 | 1 |
| 2.025 | 1 |
| 2.015 | 1 |

TABLE I-continued

| X-ray diffraction pattern of the crude synthetic sample of SAPO-5 phase prepared according to Example 1. | |
|---|---|
| d hkl 10$^{-10}$ m | I/Io |
| 1.905 | 3 |

The analysis of Si, Al and P in the crystals by an electron microprobe gives the following composition (average over several determination points):

$(Si_{0.017}Al_{0.529}P_{0.453})O_2$

The fluorine content, measured by neutron activation, is 0.7 % by weight.

The weight losses measured by TG (thermogravimetric analysis) in air are the following:

| $H_2O$ | $Pr_3N + F$ |
|---|---|
| 2.7% | 9.9% |

After calcination at 550° C. in air for 8 hours, and rehydration in a humidifier at room temperature at 80% relative humidity, the solid takes up 23% by weight of water. The fluorine content after calcination in dry air, determined by $^{19}F$ NMR on the solid is approximately 0.01 to 0.1% by weight.

The following n-hexane and benzene adsorption capacities were measured with the aid of an electrobalance on the sample calcined at 550° C.

| | Kinetic diameter 10$^{-10}$ m | T (°C.) | P/Po | Quantity adsorbed (weight %) |
|---|---|---|---|---|
| n-hexane | 4.3 | 20 | 0.9 | 6.2 |
| benzene | 5.85 | 20 | 0.9 | 8.1 |

After calcination of the crude product for 8 hours at 880° C. in air the X-ray diffraction pattern is similar to that of Table I and does not show any change in crystallinity.

After treatment with pure water vapour at 750° C. for 17 hours the crystallinity is still 100% relative to the calcined product.

EXAMPLE 2: PREPARATION OF SAPO-5

Example 1 is repeated, the operating conditions being changed.

The reaction mixture identical with that of Example 1 is heated to 150° C. for 88 hours in a static autoclave. The fraction used corresponds to 1/40 of a mole of $Al_2O_3$.

Inspection of the solid obtained using an optical microscope shows crystals in the form of hexagonal prisms of various sizes (15×50 μm to 5×5 μm).

The X-ray diffraction pattern of the crude product is similar to that of Table I.

Analysis of Si, Al and P in the crystals by electron microprobe gives the following composition:

$(Si_{0.015}Al_{0.527}P_{0.458})O_2$

The X-ray mapping of silicon on these crystals shows, in some cases, an enrichment in silicon at the periphery.

EXAMPLE 3: PREPARATION OF SAPO-5

Example 1 is repeated, the source of aluminium being changed.

The source of aluminium employed in this preparation is a hydrated aluminium oxide synthesized in the laboratory (Al OOH=Al$_2$O$_3$62.8% H$_2$O 37.2%) instead of aluminium isopropoxide, the sources of silicon and of phosphorus being otherwise still the same.

The molar composition of the reaction mixture is:

2Pr$_3$N:0.6SiO$_2$:1Al$_2$O$_3$:1 P$_2$O$_5$:76 H$_2$O:1HF

The fraction used corresponds to 1/40 of a mole of Al$_2$O$_3$, the heating and pH conditions being equal to those of Example 1.

The X-ray diffraction pattern of the solid obtained is similar to that of Table I.

The analysis of Si, Al and P in the crystals gives the following composition:

(Si$_{0.011}$Al$_{0.506}$P$_{0.483}$)O$_2$

The losses in weight measured by TG, are the following:

| H$_2$O | Pr$_3$N + F |
|---|---|
| 3% | 10.4% |

After calcination at 550° C. and rehydration, the solid takes up 23% by weight of water. X-ray diffration analysis shows a pattern similar to that of the crude product of synthesis.

EXAMPLE 4: PREPARATION OF SAPO-5

Example 1 is repeated, the nature of the organic structuring agent being changed.

In this preparation, diethylethanolamine (Fluka) is employed as structuring agent instead of tripropylamine, the molar composition and the conditions of heating the reaction mixture being otherwise the same as those of Example 1. The fraction used corresponds to 1/40 of a mole of Al$_2$O$_3$ and the pH=6.

Inspection of the solid obtained using an optical microscope shows crystals in the form of hexagonal prisms of average size 4×15 μm.

The X-ray diffraction pattern is similar to that of Table I.

The analysis of Si, Al and P in the crystals gives the following composition:

(Si$_{0.013}$Al$_{0.479}$P$_{0.508}$)O$_2$

After calcination at 550° C. and rehydration, the solid takes up 24% by weight of water; the X-ray diffraction pattern is similar to that of the crude product of synthesis.

EXAMPLE 5: (COMPARATIVE) PREPARATION OF SAPO-5

This example illustrates the importance of the presence of fluoride ions in the synthesis medium for the crystallinity and the heat stability of the SAPO-5.

A test was carried out in the absence of fluoride ions in the conditions of Example 1.

X-ray diffraction analysis of the solid obtained shows the presence of more than 50% of amorphous materials.

In a second test, the reaction period was multiplied by three. The diffraction pattern obtained is then similar to that of Table I.

The inspection of this second sample with an optical microscope and by SEM shows hexagonal prismatic crystals 1–5 μm×10–15 μm in size, whose faces are covered with impurities, as well as unidentified, more or less flaky aggregates and particles.

The analysis of (Si, Al and P in the crystals gives the following composition:

(Si$_{0.013}$Al$_{0.501}$P$_{0.486}$)O$_2$

After calcination at 550° C. the water uptake of the solid is 23% by weight.

The X-ray diffraction patterns obtained on the solid calcined at 550° C. and at 880° C. in the conditions referred to in Example 1 shows a slight drop in crystallinity compared with the products obtained according to the invention.

After treatment with pure water vapour for 17 hours at 750° C. the crystalline fraction is identical with that of the calcined product.

EXAMPLE 6: PREPARATION OF SAPO-11

A reaction mixture made up of 30 g of water and 5.8 g of orthophosphoric acid (Prolabo) is prepared, to which 10.2 g of aluminium isopropoxide (Merck) are added. The mixture is stirred until homogenized. To this mixture are added, with stirring, 2.3 g of 40% colloidal silica (Ludox AS 40), followed by 1 g of 48% hydrofluoric acid (Prolabo) and 2.5 g of di-n-propylamine (Fluka). The mixture is stirred for several hours.

The molar composition of the final mixture is the following:

1Pr$_2$NH:0.6 SiO$_2$:1Al$_2$O$_3$:1P$_2$O$_5$:73H$_2$O:1HF (The fraction used corresponds to 1/40 of a mole of Al$_2$O$_3$).

The reaction mixture (pH=6.5) is heated to 170° C. for 20 hours with stirring.

Inspection of the solid obtained with an optical microscope shows crystals in the form of a parallelepiped of approximately 4×6 μm.

X-ray diffraction analysis of the crude product shows that it is a pure SAPO-11 phase, characterized by the diffraction pattern of Table II.

TABLE II

X-ray diffraction pattern of the crude synthetic sample of SAPO-11 phase prepared according to Example 6.

| d hkl 10$^{-10}$ m | I/Io |
|---|---|
| 10.9 | 32 |
| 9.3 | 60 |
| 6.67 | 19 |
| 5.64 | 40 |
| 5.43 | 6 |
| 4.667 | 9 |
| 4.329 | 44 |
| 4.217 | 100 |
| 4.010 | 51 |
| 3.931 | 61 |
| 3.905 | 72 |
| 3.822 | 81 |
| 3.630 | 8 |
| 3.601 | 11 |
| 3.566 | 6 |

TABLE II-continued

X-ray diffraction pattern of the crude synthetic sample of SAPO-11 phase prepared according to Example 6.

| d hkl $10^{-10}$ m | I/Io |
|---|---|
| 3.379 | 14 |
| 3.336 | 17 |
| 3.140 | 6 |
| 3.118 | 15 |
| 3.066 | 5 |
| 3.025 | 6 |
| 2.859 | 3 |
| 2.838 | 10 |
| 2.720 | 16 |
| 2.619 | 11 |
| 2.506 | 4 |
| 2.459 | 6 |
| 2.396 | 9 |
| 2.378 | 10 |
| 2.279 | 3 |

TABLE III

X-ray diffraction pattern of the sample of SAPO-11 phase, calcined at 550° C. in air, rehydrated at 80% RH, prepared according to Example 6

| d hkl $10^{-10}$ m | I/Io |
|---|---|
| 11.04 | 21 |
| 9.11 | 56 |
| 7.62 | 5 |
| 6.96 | 27 |
| 6.50 | 5 |
| 6.10 | 5 |
| 5.53 | 72 |
| 5.06 | 2 |
| 4.57 | 13 |
| 4.48 | 30 |
| 4.29 | 6 |
| 4.073 | 100 |
| 4.019 | 55 |
| 3.965 | 48 |
| 3.814 | 34 |
| 3.798 | 57 |
| 3.720 | 18 |
| 3.674 | 16 |
| 3.517 | 6 |
| 3.463 | 19 |
| 3.424 | 12 |
| 3.336 | 12 |
| 3.276 | 13 |
| 3.229 | 17 |
| 3.206 | 13 |
| 3.140 | 7 |
| 3.010 | 29 |
| 2.938 | 15 |
| 2.820 | 8 |
| 2.748 | 23 |
| 2.638 | 8 |
| 2.597 | 4 |
| 2.519 | 11 |
| 2.415 | 8 |
| 2.360 | 4 |
| 2.319 | 13 |
| 2.199 | 8 |

The X-ray mapping of the silicon on the crystals shows an intracrystalline heterogeneity; the analysis of Si, Al and P in the crystals gives the following compositions:

crystal edge $(Si_{0.024}Al_{0.506}P_{0.470})O_2$ crystal core $(Si_{0.10}Al_{0.466}P_{0.434})O_2$ The fluorine content of the crude solid, measured by neutron activation, is 1.3% by weight.

The weight losses, measured by TG, are the following:

| $H_2O$ | $Pr_2NH + F$ |
|---|---|
| 2.2% | 10.5% |

After calcination at 550° C. and rehydration, the solid takes up 14 % by weight of water. A phase transition induced by the hydration is observed. The diffraction pattern of the hydrated calcined solid is shown in Table III and shows very good crystallinity.

The fluorine content after calcination in dry air is from 0.01 to 0.1% by weight.

After calcination at 900° C. in air for 6 hours and rehydration, the product shows an X-ray diffraction pattern identical with that of Table III and therefore shows very good heat stability.

EXAMPLE 7: PREPARATION OF SAPO-11

This example illustrates the possibility of working in the presence of seeds making it possible to reduce the heterogeneity of the distribution of silicon, observed in Example 6.

A preparation identical with that of Example 6 is carried out, with the addition of seeds (0.1% by weight) consisting of crystals of the sample of phase SAPO-11 of Example 6, which are finely ground. The fraction used corresponds to 1/20 of a mole of $Al_2O_3$, the heating and pH conditions being otherwise identical with those of Example 6.

Inspection of the solid obtained in an optical microscope and by SEM shows single crystals of parallelepipedal form, 3×5 µm, and twinnings 8 µm in size.

X-ray diffraction analysis of the crude product gives a diffraction pattern similar to that of Table II.

The X-ray mapping of silicon on the crystals shows an inter- and intracrystalline heterogeneity, but which is less pronounced than in Example 6. The analysis of Si, Al and P in the crystals gives the following compositions:

| edges of twinnings or single crystals | $(Si_{0.027}Al_{0.508}P_{0.465})O_2$ |
|---|---|
| twinning core | $(Si_{0.046}Al_{0.496}P_{0.458})O_2$ |

The fluorine content, measured by neutron activation in a crude solid, is 1.2% by weight.

The weight losses, measured by TG are the following:

| $H_2O$ | $Pr_2NH + F$ |
|---|---|
| 1.5% | 9.9% |

After calcination at 550° C. and rehydration, the phase transition induced by the hydration, characteristic of the SAPO-11 phase, is observed. The X-ray diffraction pattern is identical with that of Table III.

The n-hexane and benzene adsorption capacities are the following:

| | Kinetic diameter $10^{-10}$ m | T (°C.) | P/Po | Quantity adsorbed (weight %) |
|---|---|---|---|---|
| n-hexane | 4.3 | 20 | 0.9 | 5.9 |

| Kinetic diameter $10^{-10}$ m | T (°C.) | P/Po | Quantity adsorbed (weight %) |
|---|---|---|---|
| benzene 5.85 | 20 | 0.9 | 6.8 |

After treatment with pure water vapour at 750° C. for 17 hours, the crystalline fraction is 100% relative to that of the hydrated calcined product.

EXAMPLE 8: PREPARATION OF SAPO-11

This example illustrates the possibility of employing a pyrogenic silica (Degussa Aerosil) instead of a colloidal silica as a source of silicon, permitting a homogeneous distribution of silicon in the crystals.

A preparation identical with that of Example 6 is carried out with the pyrogenic silica, and heated in the same conditions. The fraction used corresponds to 1/40 of a mole of $Al_2O_3$ and the pH is 6.5.

X-ray diffraction analysis of the solid obtained gives a diffraction pattern similar to that of Table 2.

The analysis of Si, Al and P in the crystals shows two crystal populations of slightly different size and composition, as follows:

| | |
|---|---|
| crystals 2 × 15 μm (minority) | $(Si_{0.04} Al_{0.47} P_{0.49})O_2$ |
| crystals 5 × 10 μm to 25 × 45 μm (majority) | $(Si_{0.019} Al_{0.507} P_{0.474})O_2$ |

X-ray mapping of the silicon shows a highly homogeneous distribution of silicon in the crystals.

After calcination at 550° C. and rehydration, the solid takes up 16 % of water by weight. The phase transition induced by the hydration, characteristic of the SAPO-11 phase is observed and the X-ray diffraction pattern is similar to that of Table III.

After calcination at 880° C. and rehydration, the same X-ray diffraction pattern is obtained and therefore shows a very good heat stability.

EXAMPLE 9: (COMPARATIVE) PREPARATION OF SAPO-11

This example illustrates the importance of the presence of fluoride ions in the synthesis medium for the heat stability of the SAPO-11 crystals.

A preparation identical with that of Example 6 is carried out but in the absence of hydrofluoric acid.

The fraction used corresponds to 1/40 of a mole of $Al_2O_3$. The reaction mixture (pH=7.5) is heated in the same conditions as in Example 6, apart from the period of time, which is multiplied by 3 (65 hours).

Inspection of the solid obtained in an optical microscope and by SEM shows polycrystalline aggregates <3-4 μm in size.

The X-ray diffraction pattern of the crude product is similar to that of Table II.

The analysis of Si, Al and P in the crystals gives the following compositions:

$(Si_{0.059}Al_{0.488}P_{0.454})O_2$

After calcination at 550° C. and rehydration, the water uptake is 16% by weight. The phase transition induced by the hydration, characteristic of the SAPO-11 phase, is observed. However, the X-ray diffraction spectrum shows a considerable drop in crystallinity, in contrast to the SAPO-11 phases synthesized in the presence of fluoride ions.

After calcination at 900° C. and rehydration, the same X-ray diffraction spectrum is observed.

EXAMPLE 10: PREPARATION OF SAPO-34

A reaction mixture made up of 37 g of water and 4 g of 85% orthophosphoric acid (Prolabo) is prepared, to which 15.3 g of aluminium isopropoxide (Merck) are added. The mixture is stirred until homogenized; to this mixture are added, with stirring, 2.25 g of 40% colloidal silica (Ludox AS 40), followed by 1 g of 48% hydrofluoric acid (Prolabo) and 9.2 g of 40% tetraethylammonium hydroxide (Fluka). The resulting reaction mixture is stirred for several hours.

The molar composition of the final mixture is the following:

1 TEAOH:0.6 Si $O_2$:1.5 $Al_2O_3$:0.7 $P_2O_5$:100 $H_2O$:1HF (The fraction used corresponds to 1/40 of a mole of $Al_2O_3$).

The mixture (pH=8.5) is heated to 200° C. with stirring for 149 hours.

Inspection of the solid obtained in an optical microscope and by SEM shows crystals of nearly cubic form, from 2 to 15 μm.

TABLE IV

X-ray diffraction pattern of the crude synthetic sample of SAPO-34 phase prepared according to Example 10

| d hkl $10^{-10}$ m | I/Io |
|---|---|
| 9.25 | 100 |
| 6.91 | 14 |
| 6.29 | 8 |
| 5.55 | 41 |
| 4.96 | 16 |
| 4.297 | 82 |
| 3.992 | 4 |
| 3.863 | 6 |
| 3.551 | 22 |
| 3.443 | 16 |
| 3.229 | 6 |
| 3.162 | 4 |
| 3.025 | 4 |
| 2.928 | 28 |
| 2.878 | 22 |
| 2.769 | 2 |
| 2.661 | 2 |
| 2.605 | 5 |
| 2.482 | 3 |
| 2.324 | 3 |
| 2.268 | 3 |
| 2.088 | 3 |
| 2.025 | 8 |
| 1.912 | 3 |
| 1.861 | 5 |

X-ray diffraction analysis of the crude product shows that it is the SAPO-34 phase characterized by the diffraction pattern of Table IV.

The analysis of Si, Al, P and K in the crystals gives the following composition:

$K_{0.01} (Si_{0.13}Al_{0.49}P_{0.38})O_2$ (The potassium originates from the aqueous solution of organic structuring agent).

The presence of fluorine is not detected by $^{19}F$ NMR.

The loss in weight of structuring agent, measured by TG, is 15.8%.

After calcination at 550° C. and rehydration, the solid takes up 34% of water by weight, and the X-ray diffraction spectrum is similar to that of Table IV.

The n-hexane and benzene adsorption capacities are the following:

|  | Kinetic diameter $10^{-10}$ m | T (°C.) | P/Po | Quantity adsorbed (weight %) |
|---|---|---|---|---|
| n-hexane | 4.3 | 20 | 0.9 | 9.2 |
| benzene | 5.85 | 20 | 0.9 | 9.7 |

After calcination at 900° C., this diffraction spectrum remains identical with that obtained after calcination at 550° C.

After treatment with pure water vapour at 750° C. for 17 hours, the crystallinity is 100 % relative to that of the hydrated calcined product.

EXAMPLE 11: PREPARATION OF SAPO-34

A reaction mixture is prepared in a similar manner to that of Example 10, but changing the proportions of Si/Al/P. The molar composition of the final mixture the following:

1 TEA OH:1 $SiO_2$:1.75 $Al_2O_3$:0.75 $P_2O_5$:100 $H_2O$: 1 HF (The fraction used corresponds to 1/40 of a mole of $Al_2O_3$).

The mixture (pH=8–8.5) is heated to 200° C. for 161 hours.

X-ray diffraction analysis of the solid obtained gives a diffraction pattern similar to that of the Table IV.

The analysis of Si, Al, P and K in the crystals gives the following chemical composition:

$K_{0.008}(Si_{0.12}Al_{0.50}P_{0.38})O_2$

The weight losses, measured by TG, are the following:

| $H_2O$ | R |
|---|---|
| 4.3% | 14.4% |

After calcination at 550° C. and rehydration, the solid takes up 35% by weight of water.

After calcination at 900° C. the X-ray diffraction spectrum is similar to that of Table IV.

EXAMPLE 12: PREPARATION OF SAPO-34

A reaction mixture identical with that of Example 11 is prepared, except for the quantity of water which is divided by two.

The mixture (pH=8–8.5) is heated to 170° C. for 303 hours.

X-ray diffraction analysis of the solid obtained gives a diffraction pattern similar to that of Table IV.

The analysis of Si, Al and P in the crystals gives the following composition:

$(Si_{0.10}Al_{0.46}P_{0.44})O_2$

The fluorine content, measured with a selective electrode, is 0.3% by weight.

The weight losses measured by TG, are the following:

| $H_2O$ | $TEA^+ + F$ |
|---|---|
| 5.9% | 14.6% |

After calcination at 550° C. and rehydration, the solid takes up 33% by weight of water.

The X-ray diffraction spectrum of the calcined product is similar to that of the crude product.

EXAMPLE 13: PREPARATION OF SAPO-34

In this preparation, morpholine (Fluka) is employed as a structuring agent instead of tetraethylammonium hydroxide. The molar composition of the final reaction mixture, prepared in a similar manner to Example 10, is the following:

1.5 Mor*:0.8 $SiO_2$:1 $Al_2O_3$:0.75 $P_2O_5$:100 $H_2O$:1 HF

* Mor=morpholine.

The fraction used corresponds to 1/40 of a mole of $Al_2O_3$.

The mixture (pH=8) is heated to 200° C. for 233 hours.

Inspection of the solid obtained in the optical microscope and by SEM shows crystals of approximately cubic form from 20 to 100 μm.

X-ray diffraction analysis results in a diffraction pattern similar to that of Table IV.

The analysis of Si, Al and P in the crystals gives the following composition:

$(Si_{0.15}Al_{0.49}P_{0.36})_2$

The fluorine content, measured with a selective electrode, is 0.5% by weight.

The weight losses, measured by TG, are the following:

| $H_2O$ | Morpholine + F |
|---|---|
| 5% | 18.3% |

After calcination at 550° C., the solid adsorbs 36% of water by weight.

The X-ray diffraction spectrum of the calcined solid is similar to that of the crude product.

EXAMPLE 14: PREPARATION OF SAPO-37

A first reaction mixture made up of 5.1 g of water and 4.2 g of 85% $H_3PO_4$ (Prolabo) is prepared, to which 2.8 g of pseudoboehmite (Catapal B from Vista Chemical Company; 76.8% $Al_2O_3$, 23.2% $H_2O$) are added.

The very thick mixture is stirred for 24 hours.

A second reaction mixture is prepared, made up of 18.5 g of 40% tetrapropylammonium hydroxide (Alfa), 0.19 g of tetramethylammonium hydroxide pentahydrate (Aldrich-Chimie) and 0.54 g of pyrogenic silica (Cab-O-Sil, Cabot Corporation), which is stirred until homogenized.

The final mixture, resulting from the addition of the above two, is stirred for several days and 0.23 g of 40% HF (Prolabo) is then added.

The molar composition is the following:

2TPAOH:0.055 TMAOH:1 $Al_2O_3$:1 $P_2O_5$:0.5 $SiO_2$:60 $H_2O$:0.25 HF (The fraction used corresponds to 1/55 of a mole of Al$_2$O$_3$).

The mixture (pH=8) is heated to 200° C. for 24 hours in a stirred autoclave lined with polytetrafluoroethylene, 65 cm$^3$ in capacity Inspection of the solid obtained in an optical microscope and by SEM shows crystals in the form of cubic octahedra from 2 to 18 μm.

X-ray diffraction analysis of the crude product shows that it is a pure SAPO-37 phase. The diffraction pattern obtained is shown in Table V.

The analysis of Si, Al and P in the crystals of the SAPO-37 phase gives the following composition:

$$(Si_{0.137}Al_{0.501}P_{0.362})O_2$$

The weight losses, measured by TG, are the following:

| H$_2$O | TPA$^+$ + TMA$^+$ + F$^-$ |
|---|---|
| 8.5% | 19.9% |

The fluorine content, estimated according to $^{19}$F NMR on the solid, is from 0.2 to 0.4% by weight.

After calcination at 550° C., the X-ray diffraction pattern of the solid which is kept dehydrated is identical with that of Table V. Hydration of the calcined product at room temperature produces a considerable drop in crystallinity.

TABLE V

X-ray diffraction pattern of the crude synthetic sample of SAPO-37 phase prepared according to Example 14

| d hkl 10$^{-10}$ m | I/Io |
|---|---|
| 14.13 | 100 |
| 8.68 | 18 |
| 7.43 | 6 |
| 5.656 | 40 |
| 4.746 | 29 |
| 4.364 | 16 |
| 3.899 | 10 |
| 3.763 | 34 |
| 3.560 | 2 |
| 3.456 | 4 |
| 3.303 | 20 |
| 3.214 | 22 |
| 3.017 | 7 |
| 2.913 | 7 |
| 2.852 | 14 |
| 2.760 | 5 |
| 2.712 | 3 |
| 2.634 | 8 |
| 2.592 | 5 |

We claim:

1. A process for the synthesis of a precursor of SAPO-5 silicoaluminophosphate molecular sieve, comprising producing a reaction mixture containing water, a source of aluminum, a source of silicon, a source of phosphorus, hydrofluoric acid as a source of fluoride ions, and an organic structuring agent selected from the group consisting of an amine, quaternary ammonium salt, an aminoalcohol, and an aminoether, heating the reaction mixture to a temperature of ≧100° C., but below the calcination temperature, under autogenous pressure for a sufficient time to effect the crystallization, and separating the crystallized solid.

2. Process according to claim 1, wherein the molar composition of the reaction mixture corresponds to:

r R:s SiO$_2$:Al$_2$O$_3$:p P$_2$O$_5$:f F:h H$_2$O wherein R denotes the structuring agent and r varies between about 0.01 and 3, s varies between about 0.01 and 3, p varies between about 0.01 and 1, f varies between about 0.01 and 2, and h varies between about 0 and 500.

3. Process according to claim 1 wherein the source of aluminum is selected from the group consisting of aluminum oxide, aluminum hydroxide, aluminum salts and aluminum alkoxides having the formula Al(OR$_1$)$_3$ where R$_1$ is a C$_1$–C$_4$ alkyl radical.

4. Process according to claim 1, wherein the source of silicon is selected from the group consisting of silica in the form of hydrogen, aerogel or colloidal suspension, silicas originating from the precipitation of soluble silicates, silicas originating from the hydrolysis of silicic esters and silicas originating from the hydrolysis of fluorosilicate complexes.

5. Process according to claim 1, wherein aluminum and silicon are obtained from a single source.

6. Process according to claim 1 wherein the source of phosphorus is selected from the group consisting of phosphoric acid, and salts and esters of phosphoric acid.

7. Process according to claim 1, wherein the reaction mixture has a pH of between about 5 and 9.

8. A process according to claim 7, comprising adjusting the pH of the reaction mixture by the addition of at least one member selected from the group consisting of acids, bases, acidic or basic salts, and of buffer mixtures.

9. Process according to claim 1, further comprising adding a source of compensating cations to the reaction mixture.

10. Process according to claim 1 further comprising heating the reaction mixture to a temperature of between about 100° and 200° C.

11. Process according to claim 1 wherein the crystallization period is between about 5 hours and 15 days.

12. A process according to claim 1, further comprising adding seeds of crystals into the reaction mixture having the same structure as the crystallized solid.

13. Process according to claim 1, further comprising drying the crystallized solid in air between about 60° C. and 100° C.

14. A SAPO-5 molecular sieve precursor prepared by the process according to claim 1 having in its anhydrous form the formula R$_{r'}$ Si$_x$ Al$_y$ P$_z$ O$_2$ F$_{f'}$ wherein the sum of x, y and z is equal to 1 and the value x lies between about 0.01 and 0.3, y is between about 0.35 and 0.50 and z is between about 0.2 and 0.49 r' is between about 0.01 and 0.2, and f' is between about 0.01 and 0.2, which corresponds to a fluorine weight content of about 0.3% to 8%.

15. A process for the production of a SAPO-5 molecular sieve comprising calcining a molecular sieve precursor having in its anhydrous form the formula R$_{r'}$ Si$_x$ Al$_y$ P$_z$ O$_2$ F$_{f'}$ wherein the sum of x, y and z is equal to 1 and the value x lies between about 0.01 and 0.3, y is between about 0.35 and 0.50 and z is between about 0.2 and 0.49, r' is between about 0.01 and 0.2, and f is between about 0.01 and 0.2, which corresponds to a fluorine weight content of about 0.3% to 8%.

16. Process according to claim 2 wherein r is between about 1 and 2, s, p and f are between about 0.5 and 1, and h is between about 50 and 100.

17. The process of claim 3 wherein the source of aluminum is selected from the group consisting of aluminum hydroxide, boehmite, pseudoboehmite alumina, gamma alumina, aluminum fluoride, aluminum sulfate, aluminum phosphate, and aluminum ispropoxide.

18. The process of claim 4 wherein the silica is selected from the group consisting of the tetraethyl ester of monoorthosilicic acid, sodium fluorosilicate, ammonium fluorosilicate, silica in the form of a colloidal suspension or an aerogel.

19. Process according to claim 5 wherein the single source of aluminum is selected from the group consisting of silica-alumina gels and crystalline aluminosilicates.

20. The process according to claim 6 wherein the source of phosphorus is selected from the group consisting of phosphoric acid, alkali metal phosphates, reactive aluminum phosphates and alkyl phosphates.

21. The process of claim 1 wherein the nitrogen derivative is selected from the group consisting of diethylamine, triethylamine, dipropylamine, tripropylamine, dibutylamine, tetraethylammonium hydroxide, tetrapropylammonium hydroxide, tetrabutylammonium hydroxide, diethylaminoethanol and morpholine.

22. Process according to claim 9 wherein the source of compensating cations is selected from the group consisting of alkali metals and alkaline-earth metals.

23. Process according to claim 22 wherein the source of compensating cations is selected from the group consisting of alkali metal chlorides, sulfates, acetates and carbonates.

24. Process according to claim 15 wherein the calcining is conducted at a temperature above about 200° C.

25. Process according to claim 24 wherein calcining is conducted at a temperature between about 400° and 700° C.

* * * * *